United States Patent
Weingaertner et al.

(10) Patent No.: US 9,673,464 B2
(45) Date of Patent: *Jun. 6, 2017

(54) DERIVATION OF CONTROL PARAMETERS OF FUEL CELL SYSTEMS FOR FLEXIBLE FUEL OPERATION

(71) Applicant: Bloom Energy Corporation, Sunnyvale, CA (US)

(72) Inventors: David Weingaertner, Sunnyvale, CA (US); Arne Ballantine, Palo Alto, CA (US); Swaminathan Venkataraman, Cupertino, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/603,788

(22) Filed: Jan. 23, 2015

(65) Prior Publication Data

US 2015/0140464 A1    May 21, 2015

Related U.S. Application Data

(60) Continuation of application No. 14/182,551, filed on Feb. 18, 2014, now Pat. No. 8,968,955, which is a division of application No. 13/525,663, filed on Jun. 18, 2012, now Pat. No. 8,685,583, which is a continuation of application No. 12/149,816, filed on May 8, 2008, now Pat. No. 8,211,583.

(51) Int. Cl.

| | |
|---|---|
| *H01M 8/04791* | (2016.01) |
| *H01M 8/04089* | (2016.01) |
| *H01M 8/0438* | (2016.01) |
| *H01M 8/0444* | (2016.01) |
| *H01M 8/04492* | (2016.01) |
| *H01M 8/04537* | (2016.01) |
| *H01M 8/04828* | (2016.01) |
| *H01M 8/04992* | (2016.01) |
| *H01M 8/0612* | (2016.01) |
| *H01M 8/124* | (2016.01) |

(52) U.S. Cl.
CPC ....... *H01M 8/04798* (2013.01); *H01M 8/045* (2013.01); *H01M 8/0438* (2013.01); *H01M 8/0447* (2013.01); *H01M 8/04089* (2013.01); *H01M 8/04388* (2013.01); *H01M 8/04395* (2013.01); *H01M 8/04447* (2013.01); *H01M 8/04462* (2013.01); *H01M 8/04589* (2013.01); *H01M 8/04835* (2013.01); *H01M 8/04992* (2013.01); *H01M 8/0618* (2013.01); *H01M 8/04805* (2013.01); *H01M 2008/1293* (2013.01); *Y02E 60/50* (2013.01); *Y02E 60/525* (2013.01)

(58) Field of Classification Search
CPC ......... H01M 8/04798; H01M 8/04089; H01M 8/0438; H01M 8/04388; H01M 8/04447; H01M 8/04395; H01M 8/04462; H01M 8/045; H01M 8/04589; H01M 8/04805; H01M 8/04835; H01M 8/04992; H01M 8/0618
See application file for complete search history.

(56) References Cited

U.S. PATENT DOCUMENTS

| | | |
|---|---|---|
| 7,294,420 B2 | 11/2007 | Hodges |
| 7,422,810 B2 | 9/2008 | Venkataraman et al. |
| 7,482,078 B2 | 1/2009 | Sridhar et al. |
| 7,723,847 B2 | 5/2010 | Makino et al. |
| 8,071,248 B2 | 12/2011 | Ballantine |
| 8,211,583 B2 | 7/2012 | Weingaertner et al. |
| 2003/0072980 A1 | 4/2003 | Formanski et al. |
| 2006/0096175 A1 | 5/2006 | Russell et al. |
| 2007/0231631 A1 | 10/2007 | Venkataraman |
| 2008/0012128 A1 | 1/2008 | Makino et al. |
| 2008/0057359 A1 | 3/2008 | Venkataraman et al. |
| 2008/0070077 A1 | 3/2008 | Gottmann |
| 2010/0239924 A1 | 9/2010 | McElroy et al. |
| 2012/0251914 A1 | 10/2012 | Weingaertner et al. |

*Primary Examiner* — Helen O Conley
(74) *Attorney, Agent, or Firm* — The Marbury Law Group PLLC

(57) ABSTRACT

A method of operating a fuel cell system includes characterizing the fuel or fuels being provided into the fuel cell system, characterizing the oxidizing gas or gases being provided into the fuel cell system, and calculating at least one of the steam:carbon ratio, fuel utilization and oxidizing gas utilization based on the step of characterization.

9 Claims, No Drawings

DERIVATION OF CONTROL PARAMETERS OF FUEL CELL SYSTEMS FOR FLEXIBLE FUEL OPERATION

The present application is a Continuation of U.S. application Ser. No. 14/182,551, filed Feb. 18, 2014, which is a Divisional of U.S. application Ser. No. 13/525,663, filed on Jun. 18, 2012, now U.S. Pat. No. 8,685,583, and which is a Continuation of U.S. application Ser. No. 12/149,816, filed on May 8, 2008, now U.S. Pat. No. 8,211,583, the content of all of which are incorporated herein by reference in their entirety.

BACKGROUND OF THE INVENTION

The present invention relates generally to the field of fuel cell systems and more particularly to parameterized control of fuel cell systems to allow for efficient operation under various atmospheric conditions and with various fuel sources.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system such as a solid oxide fuel cell (SOFC) system, an oxidizing gas is passed through the cathode side of the fuel cell while a fuel flow is passed through the anode side of the fuel cell. The oxidizing gas is typically air, while the fuel flow is typically a hydrogen-rich gas created by reforming a hydrocarbon fuel source. Water may also be introduced into the system in the form of steam. The fuel cell, typically operating at a temperature between 750° C. and 950° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

SUMMARY OF THE INVENTION

The first embodiment of the invention is a method of operating a fuel cell system in which the fuel and/or oxidizing gas being provided into the fuel cell system are characterized and at least one of the steam:carbon ratio, fuel utilization and oxidizing gas utilization is calculated based on this characterization.

DETAILED DESCRIPTION OF THE PREFERRED EMBODIMENTS

In fuel cells utilizing air as the oxidizing gas, fuel cell operation is typically controlled such that the steam:carbon ratio, fuel utilization, and oxidizing gas utilization stay within nominal operation ranges. However, various fuel sources with differing carbon contents can be used in fuel cell operation. This, along with variations in local atmospheric conditions, can cause the actual steam:carbon ratio, fuel utilization, and oxidizing gas utilization to deviate from values of these parameters derived from calculations based on assumptions of fuel and air composition.

Given the potential deployment of fuel cell systems in a multitude of locations, each subject to variances in fuel composition and local atmospheric conditions, it is desirable to have a relatively few simplified parameters to characterize the fuel and oxidizing gas for control of fuel cell systems. Such simplified parameterized control has the added benefit of easing the transition from one fuel source to another while the fuel cell is under load or enabling the utilization of a plurality of fuels, oxidation gases, or both, at the same time.

The inventors realized that parameterized control of fuel cell system operation can be accomplished through the use of a few derived quantities (i.e., steam:carbon (S:C) ratio, fuel utilization, and oxidizing gas utilization) and that simplified derivation of these quantities can be accomplished through calculations based on characterizing fuel composition and oxidizing gas composition. In instances where the oxidizing gas is air, local atmospheric conditions can be used to derive the oxidizing gas composition.

Additionally, the inventors realized that parameterized control of fuel cell systems with these few derived quantities can aid in the operation of a fuel cell system utilizing a plurality of fuels and/or a plurality of oxidizing gases. This is especially useful to facilitate transition from one fuel to another while under load or operation of the fuel cell with a plurality of fuel sources.

Preferably the fuel cell system to be controlled contains one or more solid oxide fuel cell (SOFC) stacks. A detailed description of a type of SOFC system is described in U.S. patent application Ser. No. 11/491,487 (filed on Jul. 24, 2006) and Ser. No. 11/002,681 (filed on Dec. 3, 2004), both hereby incorporated by reference in their entirety.

A practical fuel cell system, such as a SOFC system, can comprise elements which include but are not limited to: steam generator(s), reformer(s), heat exchanger(s), blower(s), condenser(s), vent(s), mixer(s), catalytic reactor(s) or any combination thereof.

"Catalytic reactor" as used herein describes an element in a fuel cell system capable of catalyzing a reaction between reactants conveyed thereto. These reactors typically comprise metal catalyst-containing tubes or other conduits. Catalytic reactors may be located at various places in a fuel cell system. Examples of catalytic reactors include, but are not limited to catalytic partial oxidation (CPOx) reactors and anode tail gas oxidation (ATO) reactors. A detailed description of a type of catalytic reactor is described in U.S. patent application Ser. No. 11/703,153 (filed on Feb. 7, 2007), which is hereby incorporated by reference in its entirety.

A CPOx reactor, for example, may be used in the start-up mode of a fuel cell system utilizing air as the oxidizing gas, to make the system independent of an external source of hydrogen. In this example, the CPOx unit produces hydrogen, water vapor, CO and $CO_2$ from the air and fuel mixture.

As used herein, the term "CPOx flow rate" is used to express the quantity of oxidizing gas introduced into a CPOx reactor. The oxidizing gas introduced into a COPx reactor is typically but not limited to air. The measurement of flow rate can be expressed in units of standard liters per minute (SLPM), although one skilled in the art would recognize that these units can readily be converted into moles per second.

As used herein, the term "water flow rate" is used to express the sum of the quantity of water introduced into the fuel cell stack or system with the fuel and the anode recycle water, if present. Water introduced into the fuel cell stack or system typically will be in the form of vapor, i.e., steam.

Typically this measurement is expressed in units of standard liters per minute (SLPM), although one skilled in the art would recognize that these units can readily be converted into moles per second.

As used herein, the term "fuel flow rate" is used to express the quantity of fuel introduced into the fuel cell. Typical fuels for fuel cell operation are fuels comprising hydrogen and carbon. Examples of typical fuels for fuel cell operation include but are not limited to hydrocarbons (including methane, ethane and propane), natural gas, alcohols (including ethanol), and syngas derived from coal or natural gas reformation. Typically this measurement is expressed in units of standard liters per minute (SLPM), although one skilled in the art would recognize that these units can readily be converted into moles per second.

As used herein, the term "fuel composition" refers to the elemental composition of fuel. This elemental composition is typically expressed in moles [X] per mole of fuel, where [X] is an element of interest. Examples of elements of interest useful for the determination of the parameters contained herein include carbon, oxygen, hydrogen and optionally nitrogen. For liquid based fuels, elemental composition may also be expressed as moles [X] per milliliter of fuel or moles [X] per gram of fuel.

As used herein, the term "cathode flow rate" is used to express the quantity of oxidizing gas introduced at the cathode of the fuel cell. The oxidizing gas introduced into at the cathode is typically but not limited to air. The measurement of flow rate can be expressed in units of standard liters per minute (SLPM), although one skilled in the art would recognize that these units can readily be converted into mol/sec.

As used herein, the term "ambient pressure" indicates absolute atmospheric pressure. Typically, this measurement is expressed in units such as pounds per square inch absolute (PSIA) or kilopascals (kPa).

As used herein, the term "alcohol" is used to generally indicate an organic compound derivitized with a hydroxyl group. Examples of alcohols include, but are not limited to methanol, ethanol and isopropyl alcohol.

Steam:Carbon Ratio

In one embodiment of the invention, the control parameter steam:carbon (S:C) ratio is derived from water flow rate, fuel flow rate, and carbon composition of the fuel (expressed as moles of carbon per moles of fuel). The water flow rate and fuel flow rate are variable quantities that can be adjusted by the operator to keep the S:C ratio within a nominal operating range. The fuel composition may be theoretically derived from the composition of the fuel used.

For example, if methane gas (i.e., $CH_4$) is used for fuel, then stoichiometric analysis indicates that there is one mole of carbon for every one mole of fuel. However, if ethanol (i.e., $CH_3CH_2OH$) is used, stoichiometric analysis indicates that there are two moles of carbon for every one mole of fuel. As it is possible that sources of fuel for fuel cell systems may be mixtures of unknown quantities of two or more fuels, such theoretical stoichiometric analysis may not always be suitable. In such cases, characterization of the carbon content of the fuel may be obtained from other sources, i.e., through direct detection or gathering the information from the commercial provider of the fuel.

Once the carbon content of the fuel is determined or obtained, the S:C ratio can be derived as follows. The S:C ratio is equal to the water flow rate divided by the fuel flow rate multiplied by carbon content of the fuel:

S:C ratio=Water Flow Rate/Carbon Flow Rate;

where Carbon Flow Rate=Fuel Flow Rate*mol C/mol Fuel; and Water Flow Rate=Molar Flow Rate of Steam from the steam generator+Anode Recycle Flow Rate*Mole Fraction of Water in the Anode Recycle Stream.

In alternative methods, carbon content of the anode recycle stream (in the form of CO and $CO_2$) is also included in the Carbon Flow Rate. Similarly, in alternative methods, $CO_2$ content of the fuel stream is included in the Carbon Flow Rate. Inclusion of the contribution from $CO_2$ to the Carbon Flow Rate is more important in systems where the fuel is biogas, which typically will have a much greater fraction of $CO_2$ than other fuel sources.

The amount of fuel and steam being introduced into a fuel cell can be varied continuously or intermittently to preferably maintain the S:C ratio in the fuel inlet stream during operation of the fuel cell stack within a nominal operating range; said nominal operating range between, 2:1 to 2.5:1 S:C; preferably between 2:1 and 2.3:1 S:C.

Fuel Utilization and Air Utilization

The control parameter fuel utilization is derived from the average cell current, total number of cells and fuel available. Fuel available is a derived quantity based on fuel composition information, fuel flow rate, CPOx flow rate, and oxygen content of the oxidizing gas at the CPOx.

The control parameter oxidizing gas utilization is derived from the average cell current, total number of cells, cathode flow rate, and the oxygen content of the oxidizing gas at the cathode.

To derive either of these control parameters, it is first necessary to characterize the oxidizing gas(es) introduced into the fuel cell system (i.e., to determine % $O_2$ in oxidizing gas(es) introduced at the CPOx and the cathode). In instances where an oxidizing gas introduced at the CPOx and/or cathode is a gas other than air, the percent oxygen can be detected, or more typically, obtained from the commercial source of that oxidizing gas. In instances where air is used as an oxidizing gas at one or both of the CPOx and/or cathode, % $O_2$ can be determined with calculations utilizing local atmospheric information including ambient temperature, ambient pressure, and relative humidity.

Characterization of Air to Determine % $O_2$

First, it must be understood that air is a mixture comprising various gaseous components, predominantly comprising $N_2$, $O_2$ and $H_2O$. The CRC Handbook of Chemistry and Physics states that the composition of dry air is: 78.084% $N_2$, 20.946% $O_2$, and 0.97% comprising many other trace components. For calculation purposes, the trace component can be lumped in with $N_2$, so that the dry composition of air can be considered to be 20.946% $O_2$ and 79.054% $N_2$. Further, treating air as an ideal gas, the total atmospheric pressure of the mixture is the summation of the partial pressures of the individual components of the mixture.

The water vapor content of air is not constant. As the water vapor content of air increases, the nitrogen and oxygen content decrease, while maintaining the $N_2$:$O_2$ ratio of dry air. Thus, in order to derive % $O_2$ in air, water vapor's contribution to atmospheric pressure must be subtracted. The contribution of water vapor to the atmospheric pressure is highly variable and can range from approximately 0%-5%. This is, in part, because the equilibrium vapor pressure of water varies significantly with temperature.

Common atmospheric data, such as the ambient temperature and relative humidity, can be used to determine water vapor's contribution to the ambient atmospheric pressure. Relative humidity (RH) is a measure of the percentage of the equilibrium vapor pressure of water that is actually found in a given sample of air. Thus, the partial pressure of water vapor in air ($P_{H2O}$) (i.e., water vapor's contribution to ambient atmospheric pressure) is easily determined by referring to data describing water's equilibrium vapor pressure at various temperatures ($P^*_{H2O}$) and multiplying the value for water's equilibrium vapor pressure at the ambient temperature by the relative humidity:

$$P_{H2O} = P^*_{H2O} * RH.$$

Data describing water equilibrium vapor pressure at various temperatures is well known in the art and can be found, for example, in tabular format in the CRC Handbook of Chemistry and Physics. Alternatively, the vapor pressure of water has typically been traditionally correlated as a function of temperature with the Antoine Equation (Reid Prausnitz and Poling, The Properties of Gases and Liquids http://www.amazon.com/exec/obidos/ASIN/0070517991/hyperadcommuni02), or more rigorously with equations published by the National Bureau of Standards http://orion.math.iastate.edu/burkardt/f_src/steam/steam.html $P_{H2O}$ can then be subtracted from the ambient atmospheric pressure ($P_{ambient}$), with the remaining pressure resulting from the contribution of the partial pressures of $O_2$ and $N_2$ ($P_{O2}$ and $P_{N2}$):

$$P_{ambient} - P_{H2O} = P_{O2} + P_{N2}.$$

Now, utilizing the ratio 20.94 $O_2$:79.06 $N_2$, $P_{O2}$ and $P_{N2}$ can be determined:

$$P_{O2} = 0.2094 * (P_{ambient} - P_{H2O});$$

$$P_{N2} = 0.7906 * (P_{ambient} - P_{H2O}).$$

Finally, the % $O_2$ and % $N_2$ are calculated as the percent $P_{O2}$ and $P_{N2}$ are of $P_{ambient}$:

$$\% \, O_2 \, (mol \, \%) = (P_{O2}/P_{ambient}) * 100\%;$$

$$\% \, N_2 \, (mol \, \%) = (P_{N2}/P_{ambient}) * 100\%.$$

The common local atmospheric data used in this determination (i.e., ambient temperature, ambient pressure and relative humidity) can be monitored on-site or readily obtained from a local weather data source.

Fuel Available (in Mol e$^-$/Sec)

Derivation of the control parameter fuel utilization also requires the determination of the fuel available. Calculation of the fuel available can be based on the number oxygen anions required to fully oxidize the fuel, or the DC electrical equivalent in moles of electrons. The analysis below is presented on the basis of the DC electrical equivalent of the oxygen anions required to fully oxidize the fuel. The fuel available is based on the fuel flow rate(s), and the C, H, O and optionally N composition of the fuel. It is then corrected for any portion of the fuel that is already oxidized in the CPOx reactor. If nitrogen in the fuel is not oxidized (i.e. it leaves the fuel cell as $N_2$), then nitrogen is not considered when determining the fuel available.

Fuel Available(in mol e$^-$/sec)=(4*C atom/mole Fuel+H atoms/mole Fuel−2*O Atoms/mole Fuel)*Fuel Flow(in mol/sec)−4*(mol $O_2$/mol CPOx flow)*CPOx flow(in mol/sec);

Fuel Utilization (%)

Once the quantity of fuel available is known, the control parameter fuel utilization is derived according to the following equation:

Fuel Utilization(%)=100%*((Average Cell Current(in Amps)*Number of Cells)/F)/Fuel Available(in mol e$^-$/sec);

where F=Faraday's constant.

Oxidizing Gas Available (in Mol e$^-$/Sec)

Similar to the derivation of fuel utilization, derivation of oxidizing gas utilization also requires determination of the oxidizing gas available. Calculation of oxidizing gas available below is based on air as the oxidizing gas, cathode flow, and mole fraction of $O_2$ in the oxidizing gas (i.e., % $O_2$):

Oxidizing Gas Available(in mol e$^-$/sec)=4*(% $O_2$/100%)*Cathode Flow(in mol/sec);

Oxidizing Gas Utilization (%)

Once the quantity of oxidizing gas available is know, the control parameter oxidizing gas utilization is derived according to the following equation:

Oxidizing Gas Utilization(%)=100%*((Average Cell Current(in Amps)*Number of Cells)/F)/Oxidizing Gas Available(in mol e$^-$/sec);

where F=Faraday's constant.

Transition from One Fuel to Another/Utilization of a Plurality of Fuels

In a second embodiment of the invention, calculations described above used to derive certain control parameters are modified in order to facilitate the gradual transition from one fuel to another while the fuel cell is under load or to account for differences in the composition of each fuel during the continued operation of a fuel cell utilizing a plurality of fuels with distinct carbon contents, hydrogen contents, and/or oxygen contents.

Accounting for use of a plurality of fuels with differing compositions, either as a transient condition when switching from one fuel to another or as a continuing condition when operating the fuel cell with multiple fuels, requires adjusting the calculations described above for the quantities of the S:C ratio and fuel available.

S:C Ratio (Multiple Fuels)

The S:C ratio for multiple fuels (i.e., fuel$_1$, fuel$_2$, ..., fuel$_x$) is calculated according to the following equation:

S:C Ratio(Multiple Fuels)=Water Flow Rate/(Carbon Flow Rate)$_{cumulative}$;

where (Carbon Flow Rate)$_{cumulative}$=Σ(Fuel$_n$ Flow Rate*(mol C atoms/mol Fuel$_n$)); and n=1 to x.

Fuel Available (Multiple Fuels)

Similarly, the fuel available from multiple fuels (i.e., fuel$_1$, fuel$_2$, ..., fuel$_x$) is calculated according to the following equation:

Fuel Available(Multiple Fuels)(in mol e$^-$/sec)= (mol e$^-$/sec from Fuel)$_{cumulative}$−((mol e$^-$/mol CPOx flow)*CPOx flow(in mol/sec));

where (mol e$^-$/sec from Fuel)$_{cumulative}$=Σ(4*(mol C atoms/mol Fuel$_n$)+(mol H atoms/mol Fuel$_n$)−2*(mol O atoms/mol Fuel$_n$))

n=1 to x; and mol e$^-$/mol CPOx Flow=4*(% $O_2$)/100%.

Having completed the derivation of the fuel available from multiple fuels, the overall fuel utilization is calculated according to the equation described above.

Transition from One Oxidizing Gas to Another/Utilization of a Plurality of Oxidizing Gases While it is unlikely to be necessary, the calculations described above used to derive certain control parameters can be modified in order to facilitate the gradual transition from one oxidizing gas to another while the fuel cell system is under load or to account for differences in the oxygen content of each oxidizing gas during the continued operation of a fuel cell utilizing a plurality of oxidizing gases.

If necessary, utilization of a plurality of oxidizing gases is most likely to occur under conditions where an air stream partially depleted in oxygen (such that the $O_2$ content was ~15-21%) was available at pressures of 1-5 psig as a primary source of oxidizing gas. Under such conditions, it may be desirable to supplement the primary oxidizing gas flow with a second oxidizing gas having a higher $O_2$ concentration.

Accounting for use of a plurality of oxidizing gases with differing oxygen contents, either as a transient condition when switching from one oxidizing gas to another or as a continuing condition when operating the fuel cell with multiple oxidizing gases, requires adjusting the calculations described above for the quantities of fuel available and oxidizing gas available.

Fuel Available (Multiple Oxidizing Gases)

If the oxidizing flow at the CPOx is a mixture of two or more oxidizing gases (i.e., oxidizing $gas_1$, oxidizing $gas_2$, . . . , oxidizing $gas_y$), the fuel available is calculated according to the following equation:

Fuel Available(Multiple Oxidizing Gases)(in mol $e^-$/sec)=(4*C atom/mole Fuel+H atoms/mole Fuel-2*O atoms/mole Fuel)*Fuel Flow(in mol/sec)-$\Sigma$((mol $e^-$/mol CPOx $Flow_m$)*CPOx $Flow_m$(in mol/sec));

where mol $e^-$/mol CPOx $Flow_m$=4*(% $O_2)_m$/100%;
(% $O_2)_m$ is the oxygen content of oxidizing $gas_m$;
CPOx $Flow_m$ is the flow rate of oxidizing $gas_m$ at the CPOx; and
m=1 to y.

Having completed the derivation of the fuel available with multiple oxidizing gases, the overall fuel utilization is derived as described above.

Oxidizing Gas Available (Multiple Oxidizing Gases)

Similarly, derivation of oxidizing gas available from a mixture of two or more oxidation gases (i.e., oxidizing $gas_1$, oxidizing $gas_2$, . . . , oxidizing $gas_y$), is calculated according to the following equation:

Oxidizing Gas Available(Multiple Oxidizing Gases) (in mol $e^-$/sec)=$\Sigma$((mol $e^-$/mol Oxidizing $Gas_m$) *(Cathode Oxidizing $Gas_m$ Flow)(in mol/sec));

where mol $e^-$/mol Oxidizing $Gas_m$=4*(% $O_2)_m$/100%;
Cathode Oxidizing $Gas_m$ Flow is the flow rate of oxidizing $gas_m$ at the cathode; and
m=1 to y.

Having completed the derivation of the oxidizing gas available from multiple oxidizing gases, the overall oxidizing gas utilization is derived as described above.

Multiple Fuels and Oxidizing Gases

In additional related embodiments, the modifications of the calculations to account for multiple fuels (e.g. $fuel_1$, $fuel_2$, . . . $fuel_x$) and multiple oxidizing gases (oxidizing $gas_1$, oxidizing $gas_2$, . . . , oxidizing $gas_y$) can be combined to allow for derivation of control parameters of a fuel cell system operating with a plurality of fuels and a plurality of oxidizing gases. No modifications beyond those described above are required for the S:C ratio and oxidizing gas available. However, the derivation of fuel available requires the additional modification:

Fuel Available(Multiple Fuel and Oxidizing Gases) (in mol $e^-$/sec)=(mol $e^-$/sec from Fuel)$_{cumulative}$-$\Sigma$((mol $e^-$/mol CPOx $Flow_m$) *CPOx $Flow_m$(in mol/sec));

where (mol $e^-$/sec from Fuel)$_{cumulative}$=$\Sigma$(4*(mol C atoms/mol $Fuel_n$)+(mol H atoms/mol $Fuel_n$)+2*(mol O atoms/mol $Fuel_n$);

mol $e^-$/mol CPOx $Flow_m$=4*(% $O_2)_m$/100%
(% $O_2)_m$ is the oxygen content of oxidizing $gas_m$;
CPOx $Flow_m$ is the flow rate of oxidizing $gas_m$ at the CPOx;
n=1 to x; and
m=1 to y.

Having completed the derivation of the fuel available with multiple fuels and oxidizing gases, the overall fuel utilization is derived as described above.

Preferred Fuel Utilization and Oxidizing Gas Utilization Ranges

Certain fuel cell systems which produce hydrogen and electricity, such as in systems described in U.S. application Ser. No. 10/446,704 (filed on May 29, 2003) and Ser. No. 11/491,487 (filed on Jul. 24, 2006), both incorporated by reference in their entirety, can operate in a number of modes, for example to optimize electrical efficiency, optimize hydrogen production, or to balance the two. While in these systems the preferred oxidizing gas utilization range remains the same regardless of the operating mode, preferred fuel utilization ranges vary depending on the desired operating mode.

The preferred oxidizing gas utilization range is 10-60%, more preferably 25-40%.

When the system is operated to optimize electricity generation (i.e., to optimize the AC electrical efficiency of the system), fuel utilization is maximized to the highest reasonable operating value, such as about 75% to 90%, for example.

When the system is operated to optimize hydrogen generation, fuel utilization is minimized to the lowest reasonable operating value, such as about 55% to 60%, for example. Furthermore, more hydrocarbon fuel may be provided to the fuel cell stack when the system operates to optimize hydrogen production than when the system operates to optimize electrical efficiency. For example, 50% to 100% more hydrocarbon fuel may be provided when the system is operating to optimize hydrogen production than when the system is operating to optimize electrical efficiency.

Computer Assisted Control of Fuel Cell Systems Through Automated Calculation of Control Parameters In another embodiment of the invention, a generic or specialized computer or another suitable logic device, such as microprocessor or ASIC, is used to perform the calculations of the above described control parameters. In certain related embodiments, data generated by sensors capable of measuring local atmospheric conditions useful for the above described calculations may be accessible by the computer. In other related embodiments, data generated by sensors capable of direct characterization of the elemental composition of fuel to be entered into the fuel cell system may be accessible by the computer. Data from sensors may be transmitted to the computer either wirelessly or through wires. In other related embodiments, local atmospheric and/or fuel composition information may be manually entered into the computer for use in the calculations. In still other related embodiments, the computer may obtain local atmospheric and/or fuel composition information from a local weather data source and/or a fuel supplier either wirelessly, through wires, or via the internet.

In additional related embodiments, the computer may be attached to a display apparatus, such as a display monitor, to display the results of the calculated control parameter(s). In these embodiments, the operator of a fuel cell system can utilize the displayed output to determine necessary adjustments to fuel, oxidizing gas and/or water flows into the system so that the control parameter(s) reach and/or stay within preferred operational ranges.

In other related embodiments, the computer used to perform the calculations or another computer networked with the computer performing the calculations may also be used to control the flow of fuel, oxidizing gas and/or water into the fuel cell system. In these embodiments, the computer can utilize the results of the calculations to determine the necessary adjustments to fuel, oxidizing gas and/or water flows into the system so that the control parameter(s) reach and/or stay within preferred operational ranges.

EXAMPLES

Example 1: Characterization of Air Under Two Different Atmospheric Conditions

As a demonstration of the characterization of air, the determination of the water, oxygen and nitrogen contents of air under two different sets of atmospheric conditions were conducted. The results of these determinations are found in Table 1.

Water, oxygen and nitrogen content of air at an ambient temperature of 22° C., ambient pressure of 14.696 psia, and relative humidity of 70% were derived by following the methods described above. The equilibrium vapor pressure of water at 22° C. was obtained from parameters published in the DIPPR 801 project.

Water, oxygen and nitrogen content of air at an ambient temperature of 30° C., ambient pressure of 14 psia, and relative humidity of 70% were also derived by following the methods described above. The equilibrium vapor pressure of water at 30° C. was obtained from DIPPR parameters.

TABLE 1

Water, Oxygen and Nitrogen Content of Air at Two Exemplary Sets of Atmospheric Conditions

| | | |
|---|---|---|
| Ambient Pressure (psia) | 14.696 | 14 |
| Ambient Temperature (° C.) | 22 | 30 |
| Ambient Relative Humidity (%) | 70 | 70 |
| $H_2O$ Content of Air (mol %) | 1.83 | 3.08 |
| $O_2$ Content of Air (mol %) | 20.56 | 20.30 |
| $N_2$ Content of Air (mol %) | 77.61 | 76.62 |

Example 2: Determination of S:C Ratio

Various exemplary fuel sources were characterized for demonstration of derivation of control parameters, including S:C ratios. Table 2 contains the elemental composition and lower heat value (LHV) of three possible fuel sources: methane, natural gas and propane. Fuels may be identified by LHV, and overall efficiency may be calculated as Total power out/Total heat content in. The data listed for natural gas is merely exemplary; the elemental composition of natural gas may vary over time and by source. Thus, the characterization of natural gas will have to be detected or obtained at the time of use.

TABLE 2

Characterization of Exemplary Fuels

| Parameter | Methane | Natural Gas | Ethanol | Propane |
|---|---|---|---|---|
| mol C atoms/mol Fuel | 1 | 1.02 | 2 | 3 |
| mol H atoms/mol Fuel | 4 | 3.99 | 6 | 8 |

TABLE 2-continued

Characterization of Exemplary Fuels

| Parameter | Methane | Natural Gas | Ethanol | Propane |
|---|---|---|---|---|
| mol O atoms/mol Fuel | 0 | 0.016 | 1 | 0 |
| mol N atoms/mol Fuel | 0 | 0.018 | 0 | 0 |
| LHV of the Fuel (in kw/SLPM) | 0.5968 | 0.6003 | 0.9183 | |

These values can be used to determine the S:C ratios as described above for the following exemplary flow rates: 90 SLPM water and 30 SLPM methane; 90 SLPM water and 30 SLPM natural gas; 90 SLPM water and 15 SLPM ethanol; and 90 SLPM water and 10 SLPM propane. Use of methane, natural gas, ethanol and propane under the above listed operating conditions yields S:C ratios of 3.0, 2.94, 3.0 and 3.0 respectively:

$$\text{S:C ratio}_{methane} = 90 \text{ SLPM } H_2O/(30 \text{ SLPM Methane} * 1 \text{ mol C atoms}/1 \text{ mol fuel}) = 3.0;$$

$$\text{S:C ratio}_{natural\ gas} = 90 \text{ SLPM } H_2O/(30 \text{ SLPM Natural Gas} * 1.02 \text{ mol C atoms}/1 \text{ mol fuel}) = 2.94;$$

$$\text{S:C ratio}_{ethanol} = 90 \text{ SLPM } H_2O/(15 \text{ SLPM Ethanol} * 2 \text{ mol C atoms}/1 \text{ mol fuel}) = 3.0; \text{ and}$$

$$\text{S:C ratio}_{propane} = 90 \text{ SLPM } H_2O/(10 \text{ SLPM Propane} * 3 \text{ mol C atoms}/1 \text{ mol fuel}) = 3.0.$$

As seen above, differing flow rates may be required for various types of fuels to operate a fuel cell system at similar S:C ratios. Additionally, each of the S:C ratios derived above are at or near a value of 3, thus indicating to an operator of a fuel cell system, or computer operating a fuel cell system, that one or both of the fuel and water flow rates need to be adjusted to compensate for the characteristics of the particular fuel utilized. In each of the exemplary cases shown above, the S:C ratio can be lowered to an optimal value through appropriately lowering water flow, increasing fuel flow, or a combination of the two.

Example 3: Derivation of Fuel Utilization with a Single Fuel and Air as Oxidizing Gas The control parameter fuel utilization was derived for a fuel cell system containing 400 cells to generate 10 Amps of current while using Natural Gas as fuel at a flow rate of 10 SLPM, air as an oxidizing gas at 300 SLPM and no air at the CPOx. Ambient atmospheric conditions were ambient temperature of 30 C, ambient pressure of 14 psia, and relative humidity of 70%. Under these atmospheric conditions, air has 20.30% $O_2$ (see Example 1 above).

Using the relevant data in the equation for fuel available described above, the fuel available is calculated to be 0.05978 mole e−/sec:

Fuel Available(in mol e−/sec)=4*(1.0202 mol C atoms/mol Natural Gas)+(3.9904 mol H atoms/mol Natural Gas)−2*(0.0160 mol O atoms/mol Natural Gas*10 SLPM Natural Gas*(1 min/60 sec)*(1 mol/22.4136 standard liters)−4*(20.30% $O_2$)/100%.*0.0 SLPM CPOx flow=0.05978 mole e−/sec With this know quantity of fuel available, the control parameter fuel utilization is derived as follows:

$$\text{Fuel Utilization (\%)} = 100\% * ((10 \text{ Amps}) * 400 \text{ Cells})/F)/(0.05978 \text{ mole } e\text{-/sec})$$
$$= 69.35\%$$

where F=Faraday's constant.

Thus under these flow and atmospheric conditions, the fuel utilization is 69.35%. This value would indicate to an operator of a fuel cell system, or a computer operating a fuel cell system, that the fuel utilization is lower than desired, and the fuel flow rate could be decreased, thereby increasing fuel utilization and decreasing costs.

Example 4: Derivation of Oxidizing Gas Utilization with a Single Fuel and Air as Oxidizing Gas The operating conditions from above (i.e., system specifications, flow rates and ambient atmospheric conditions found in Example 3) were used to determine the control parameter oxidizing gas utilization. Under these atmospheric conditions, air has 20.30% $O_2$ (see Example 1 above).

Using the relevant data in the equation for oxidizing gas available described above, the oxidizing gas available is calculated to be 22.89%:

Oxidizing Gas Available(in mol e-/sec)=4*(20.30% $O_2$)/100%*300 SLPM main air*(1 min/60 sec) *(1 mol/22.4136 standard liters)=0.1811 mol e-/sec Once the quantity of oxidizing gas available is know, the control parameter oxidizing gas utilization is derived as follows:

$$\text{Oxidizing Gas Utilization (\%)} = 100\% * ((10 \text{ Amps}) * 400 \text{ Cells})/F)/(0.1811 \text{ mole } e\text{-/sec})$$
$$= 22.89\%$$

where F=Faraday's constant.

Thus under these oxidizing flow and atmospheric conditions, the oxidizing gas utilization is 22.89%. This value would indicate to an operator of a fuel cell system, or a computer operating a fuel cell system, that air utilization is lower than desired, and main air flow could be decreased.

The foregoing description of the invention has been presented for purposes of illustration and description. The methods and devices illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. It is intended that the scope of the invention be defined by the claims appended hereto, and their equivalents.

The invention claimed is:

1. A method of operating a fuel cell system, comprising:
characterizing a fuel mixture comprising two or more hydrocarbon fuels being provided into the fuel cell system by obtaining a measure of a quantity of carbon in a sample of the fuel mixture;
obtaining a water flow rate into the fuel cell system; and
calculating a steam:carbon (S:C) ratio based on the characterization of the fuel mixture and the water flow rate,
wherein the mixture of two or more fuels comprises two or more different hydrocarbon fuels with distinct carbon contents, hydrogen contents, and/or oxygen contents.

2. The method of claim 1, wherein the two or more hydrocarbon fuels are different fuels selected from the group consisting of methane, natural gas, propane, alcohol, or syngas derived from coal or natural gas reformation.

3. The method of claim 1, further comprising:
providing the fuel mixture and an oxidizing gas to the fuel cell system based on the calculated S:C ratio; and
generating electricity using the fuel cell system.

4. The method of claim 1, wherein obtaining the measure of the quantity of carbon in the sample of the fuel mixture comprises determining moles of carbon per gram or milliliter or mole of fuel.

5. The method of claim 1, wherein obtaining the measure of the quantity of carbon in the sample of the fuel mixture comprises obtaining the fuel characteristics from the fuel supply source.

6. The method of claim 1, wherein obtaining the measure of the quantity of carbon in the sample of the fuel mixture comprises measuring or testing the fuel.

7. The method of claim 1, wherein:
the S:C ratio is calculated according to the following formula:

S:C ratio=Water Flow Rate/(Fuel Flow Rate*mol C/mol Fuel).

8. The method of claim 1, wherein said fuel cell system is a solid-oxide fuel cell system.

9. The method of claim 1, wherein a computer or a logic device performs the step of calculating.

* * * * *